US011913279B2

(12) United States Patent
Magro et al.

(10) Patent No.: US 11,913,279 B2
(45) Date of Patent: Feb. 27, 2024

(54) MAINTENANCE-FREE ROLLING DOOR VACUUM SLAT

(71) Applicant: Alpine Overhead Doors, Inc., East Setauket, NY (US)

(72) Inventors: Michael Magro, Stony Brook, NY (US); Sebastian Magro, Stony Brook, NY (US)

(73) Assignee: ALPINE OVERHEAD DOORS, INC., East Setauket, NY (US)

( * ) Notice: Subject to any disclaimer, the term of this patent is extended or adjusted under 35 U.S.C. 154(b) by 0 days.

(21) Appl. No.: 17/734,855

(22) Filed: May 2, 2022

(65) Prior Publication Data

US 2023/0349225 A1 Nov. 2, 2023

(51) Int. Cl.
*E06B 9/15* (2006.01)
*E06B 9/17* (2006.01)

(52) U.S. Cl.
CPC .................. *E06B 9/15* (2013.01); *E06B 9/17* (2013.01); *E06B 9/17076* (2013.01); *E06B 2009/1505* (2013.01); *E06B 2009/17069* (2013.01); *E06B 2009/17092* (2013.01)

(58) Field of Classification Search
CPC .......... E06B 9/15; E06B 9/17; E06B 9/17076; E06B 2009/1505; E06B 2009/17069; E06B 2009/17092; E06B 9/266; E06B 9/386; B60J 7/0015
See application file for complete search history.

(56) References Cited

U.S. PATENT DOCUMENTS 4,628,982 A * 12/1986 Labelle ..................... E06B 9/15 160/235
4,644,725 A * 2/1987 Schijf ..................... E04C 2/405 52/465
4,972,894 A * 11/1990 Machill ..................... E06B 9/17 160/235
5,168,674 A * 12/1992 Molthen ................ E04B 1/803 52/592.1

(Continued)

FOREIGN PATENT DOCUMENTS

CN 209523681 U 10/2019
CN 209637598 U 11/2019

(Continued)

OTHER PUBLICATIONS

Cremers; DE 102004026900 Machine translation; retrieved from https://worldwide.espacenet.com/publicationDetails/biblio?CC=DE&NR=102004026900A1&KC=A1&FT=D&ND=3&date=20051222&DB=&locale=en_EP (Year: 2005).*

*Primary Examiner* — Abe Massad
(74) *Attorney, Agent, or Firm* — Nolte Lackenbach Siegel; Myron Greenspan

(57) ABSTRACT

A maintenance-free rolling door vacuum slat includes an elongate tubular member forming a cavity with a substantially uniform cross-sectional configuration along its length and forming first and second opposing ends conforming to the cross-sectional configuration. A first cap seals the first end. A second cap seals the second end, a vacuum being formed within the cavity. The first and second caps are joined to the elongate member to form a hermetic seals to render the slat airtight forming a permanent vacuum insulation barrier that requires no maintenance to restore the vacuum within the cavity.

7 Claims, 18 Drawing Sheets

(56) References Cited

U.S. PATENT DOCUMENTS

| | | | | | |
|---|---|---|---|---|---|
| 5,365,990 | A * | 11/1994 | Ueda | E06B 9/15 | 160/133 |
| 5,839,493 | A * | 11/1998 | Quasius | E06B 9/581 | 160/133 |
| 5,941,021 | A * | 8/1999 | Valls, Jr. | E06B 7/086 | 49/92.1 |
| 8,534,003 | B2 | 9/2013 | Curry, III | | |
| 9,056,952 | B2 * | 6/2015 | Eilbracht | C08J 9/0066 | |
| 10,914,505 | B2 * | 2/2021 | Allard | B32B 3/08 | |
| 2003/0024659 | A1 * | 2/2003 | Begni | E06B 9/15 | 160/235 |
| 2009/0031659 | A1 * | 2/2009 | Kalfon | H05K 7/20 | 137/511 |
| 2021/0246713 | A1 * | 8/2021 | Kozisek | E06B 3/485 | |

FOREIGN PATENT DOCUMENTS

| | | | | |
|---|---|---|---|---|
| DE | 3312708 | A * | 10/1984 | E06B 9/15 |
| DE | 102004026900 | A1 * | 12/2005 | E04F 13/007 |
| DE | 102005012064 | A1 * | 4/2006 | E04B 1/78 |
| DE | 102005013414 | A1 * | 9/2006 | E06B 9/15 |
| DE | 102005013414 | A1 | 9/2006 | |
| DE | 202008003113 | U1 | 6/2008 | |
| DE | 102012000722 | A1 | 7/2013 | |

* cited by examiner

MAINTENANCE-FREE ROLLING DOOR VACUUM SLAT

BACKGROUND OF THE INVENTION

1. Field of the Invention

The invention generally relates to rolling doors and, more specifically, to a maintenance-free rolling door vacuum slat.

2. Description of the Prior Art

Rolling doors have and continue to be used in a variety of applications. They include such categories as: storm doors; fire and smoke doors; air-leakage doors, counter shutters and the like. What they have in common is a construction that allows them to be rolled up onto a drum, tube or shaft when in the open position or, to be unreeled when the door is being lowered. Theses doors are typically used in commercial establishments to seal or close off large doorways, or bays, and can be operated electrically, manually or both. Rolling doors are typically formed of a series of long elongate slats that are hingedly coupled or linked to each other.

The interlocking horizontal slats, when lifted, travel along a track and coil around a drum directly overhead. The slats on coiling doors are generally much shorter and thinner than those of sectional doors.

Slats are frequently elongate hollow members closed at their opposite ends by mechanical components that serve one or more functions including guiding the slats along tracks or guides. However, slats are typically filled with air or, in some cases, filled with thermal insulation materials such as foam. However, they are normally thermally conductive and have low R-values below 11.

U.S. Pat. No. 5,419,386 discloses a metal slats that include plastic insulation members. Such slats are normally open at opposing ends or have those ends closed by a mechanical component. Such slats seek to provide insulation properties but still have low R-values.

In DE202008003113 vacuum-insulated shutters are disclosed that include an insulating element filled with a mineral or other material surrounded by a gas tight and diffusion tight material from which air has been permanently evacuated. The inserted insulating element can be removed from the roller shutter element. Only the insulating element is purged of air.

DE102005013414 discloses shutters made from vacuum insulation panels that are made up of micro-porous silicon oxide with a casing made from metallized high pressure-tight plastic foil that may be filled with a heat insulation. Each of the panels may have, at both ends, a clamp or a clip equipped with a cord strap or hook guide that firmly holds the panel such that all panels form, together, a shutter that can be adjusted either by hand or electrically. The entire shutter may be processed in a plastic foil that has only soft insulation.

CN209523681U discloses a Sound-insulation heat-insulation fireproof device for a cabin. The utility model discloses a kind of sound-insulating and heat-insulating firebreak device for a cabin, including a machinery space bulkhead and rolling screen door, rolling screen door wrapped on spool arranged above a machinery space bulkhead.

The sound-insulating and heat-insulating firebreak device of the utility model, rolling screen door can absorb noise and the vibration of machinery to improve ship comfort level, when machinery does not work. Multiple vacuum layers are used by the vacuum insulation panel to provide the functions of sound-insulating and heat-insulating fireproof purpose of the cabin.

CN209637598U discloses a Fireproof roller shutter door that includes a vacuum chamber of thermal insulation, fire resisting material particles filling the vacuum chamber.

DE102012000722A1 includes a valve used to remove air from a shutter box insulation with plastic hollow molding to create a vacuum. However, that arrangement involves a pump that removes air and therefore requires periodic maintenance.

SUMMARY OF THE INVENTION

It is an object of the invention to provide a method and apparatus for creating a vacuum slat that does not have the disadvantages inherent in prior art slats.

It is another object of the invention to provide a slat for a rolling door that has improved thermal insulating R-values.

It is still another object of the invention to provide a vacuum slat for a rolling door that is simple in construction and inexpensive to manufacture.

It is yet another object of the invention to provide a vacuum slat that has R-values greater than existing insulating slats without the need for periodic maintenance to maintain desired levels of vacuum within the slats.

In order to achieve the above objects, as well as others that will become evident hereinafter, a maintenance-free rolling door vacuum slat comprises an elongate tubular member having a cavity with a substantially uniform cross-sectional configuration along its length and forming first and second opposing open ends conforming to said cross-sectional configuration. A first cap closes the first end. A second cap closes the second end, a vacuum being formed within the cavity, said first and second caps being joined to the elongate member to form hermetic seals to render the slat airtight, whereby a permanent vacuum insulation barrier is formed within the slat that requires no maintenance to periodically restore the vacuum within the slat.

Another feature of the invention is to create a reinforcing member within the slat, such as one or more walls or ribs, that prevents the slats from caving in or otherwise deforming when the air is extracted from the slats creating significant pressure differentials between the inside and outside of the slats.

BRIEF DESCRIPTION OF THE DRAWINGS

The following descriptions are in reference to the accompanying drawings in which the same or similar parts are designated by the same numerals throughout the several drawings, and wherein.

DETAILED DESCRIPTION

Figure 1:
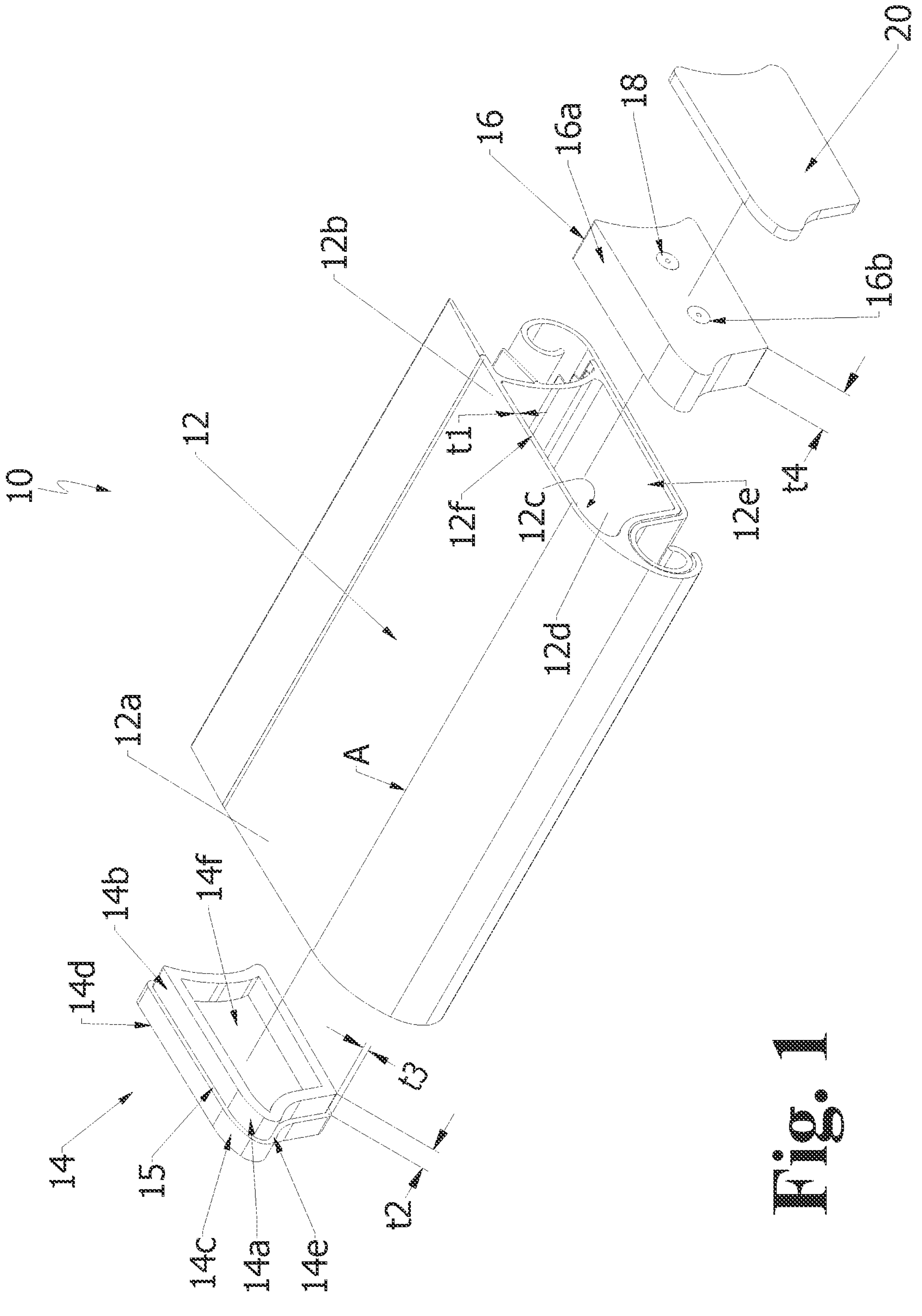
FIG. 1 is an exploded perspective view of a rolling door slat in accordance with the invention.

Referring now to the figures, in which identical or similar parts are designated by the same reference numerals throughout, and first referring to FIG. 1, a slat in accordance with the present invention is generally designated by the reference numeral 10.

The slat 10 in accordance with the invention includes an elongated extruded profile 12 that can be formed of any suitable metal or plastic that is generally rigid and may withstand deformations under pressure—positive or negative. Examples of rigid materials include metals, such as steel or aluminum, Plexiglass, Lexan and PVC although other materials may be used that have similar rigidity properties. Typically, such slats are formed of metal and the extruded profiles can be similar to those currently used in the rolling door industry. The extruded profile 12 defines an axis A and has a predetermined length and opposing ends 12*a*, 12*b* and an elongate cavity 12*c* that has a uniform cross-section between the ends, providing openings 12*d* at each of the ends that have the same size and shape configuration as the uniform cross-section of the extruded profile. The cavity 12*c* has an internal surface 12*e* and a lateral edge surface 12*f* at each end. While the lateral edge surface 12*f* may vary over the perimeter encircling the openings 12*d* the minimum thickness of the walls is t1. A feature of the invention is that when fully assembled openings 12*d* are hermetically and permanently sealed. When a vacuum is created within the cavity 12*c* the hermetic seals maintain the vacuum within the slat 10 indefinitely without the need of maintenance or periodic purging of air that may otherwise enter the slat and degrade the insulative properties or R-value of the slat.

In FIG. 1 the slat 10 includes a first end cap or cover 14 that includes a first portion 14*a* that has an exterior surface 14*b* that generally simulates or conforms to the size and shape of the internal surface 12*e* and has an axial thickness t2. The cover 14 includes a second portion 14*c* that forms an exterior surface 14*d* and is incrementally larger than portion 14*a* to create a peripheral step or ledge 15 that forms an incremental peripheral surface area 14*e* having a thickness t3 that corresponds to the lateral edge surface 12*f*. The axially remote or outwardly facing surface of the second portion 14*c* is closed by a wall 14*f*. The portion 14*a* is receivable within the opening 12*d* at the first end 12*a* with little or no clearance. When the entire axial length or thickness t1 is received within the cavity 12*c* the incremental surface area 14*e* abuts against the lateral edge surface 12*f* at the opening 12*d* at the first end 12*a*. The first end cover 14 is fixedly secured to the extruded profile 12 in any suitable or conventional manner, such as welding, adhesive, epoxy or the like, to provide a full and permanent seal or hermetic closure at the first end 12*a*. It will be clear that the specific manner of closing and permanently sealing the first end 12*a* is not critical and any end cap or cover and sealing technique may be used as long as a permanent hermetic seal is formed at the first end.

Figure 2:
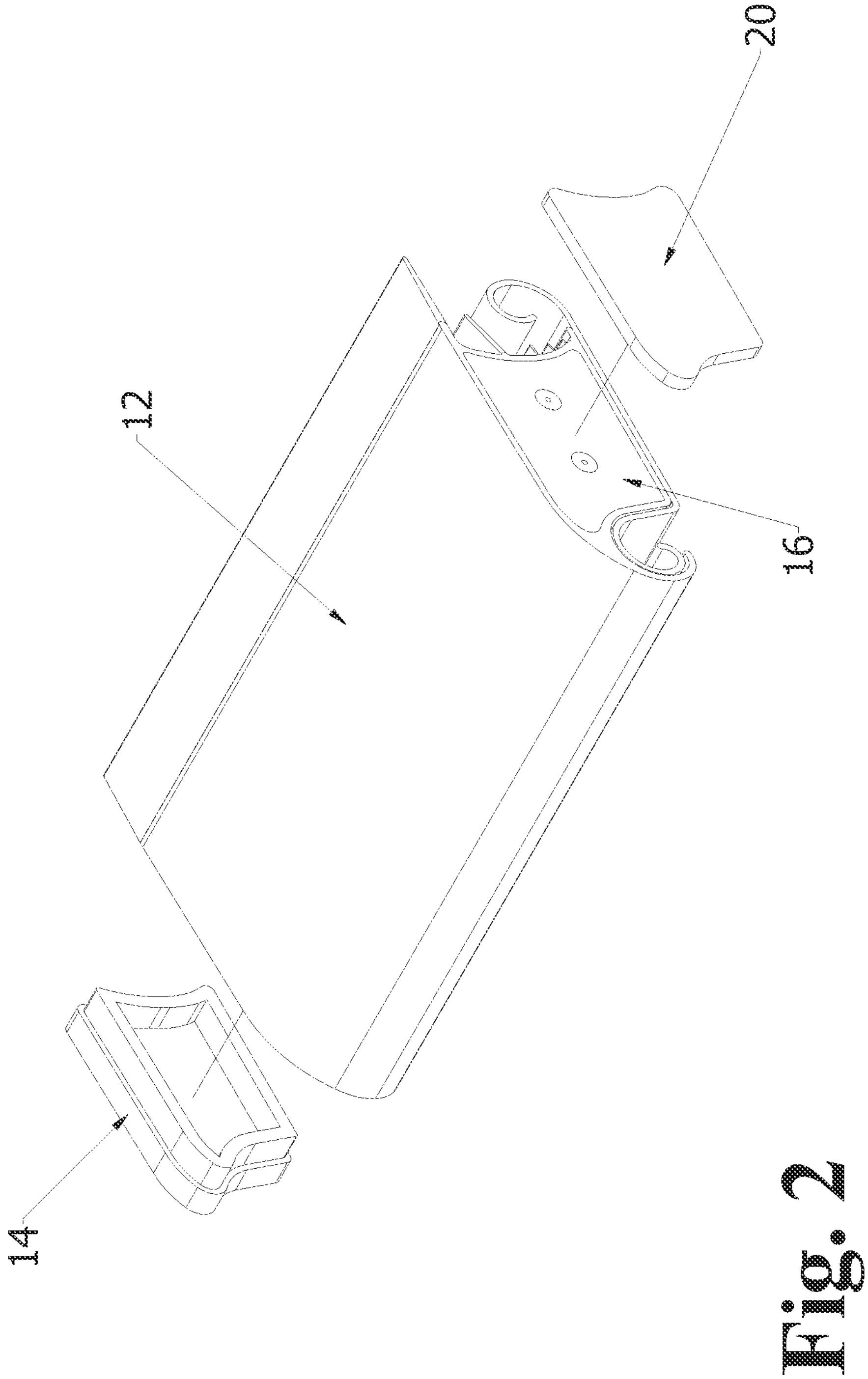
FIG. 2 is similar to FIG. 1 but shows the slat partially assembled.
Figure 3:
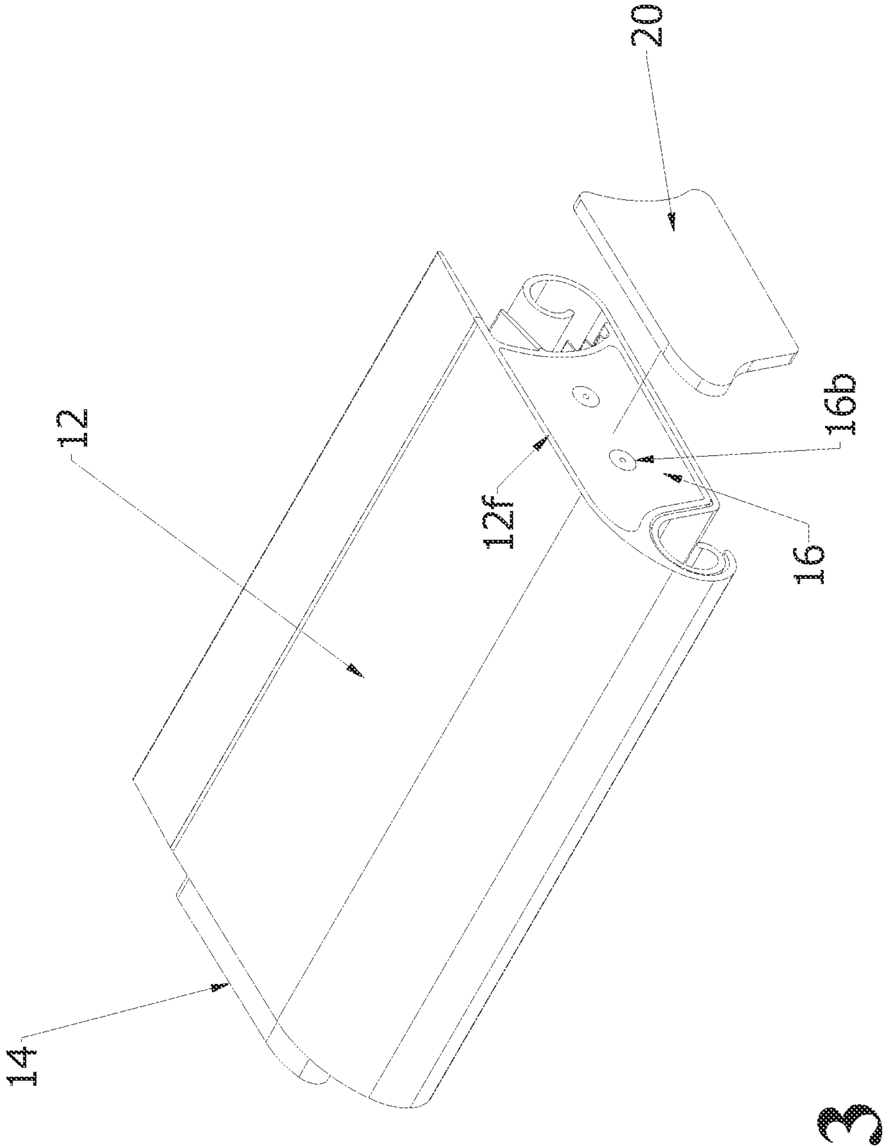
FIG. 3 is similar to FIG. 2 shown with end covers or caps inserted within the slat cavity, with one end cover provided with valves for extracting air from the slat to create a desired vacuum and showing a solid plate prior to full assembly to hermetically seal the slat.
Figure 4:
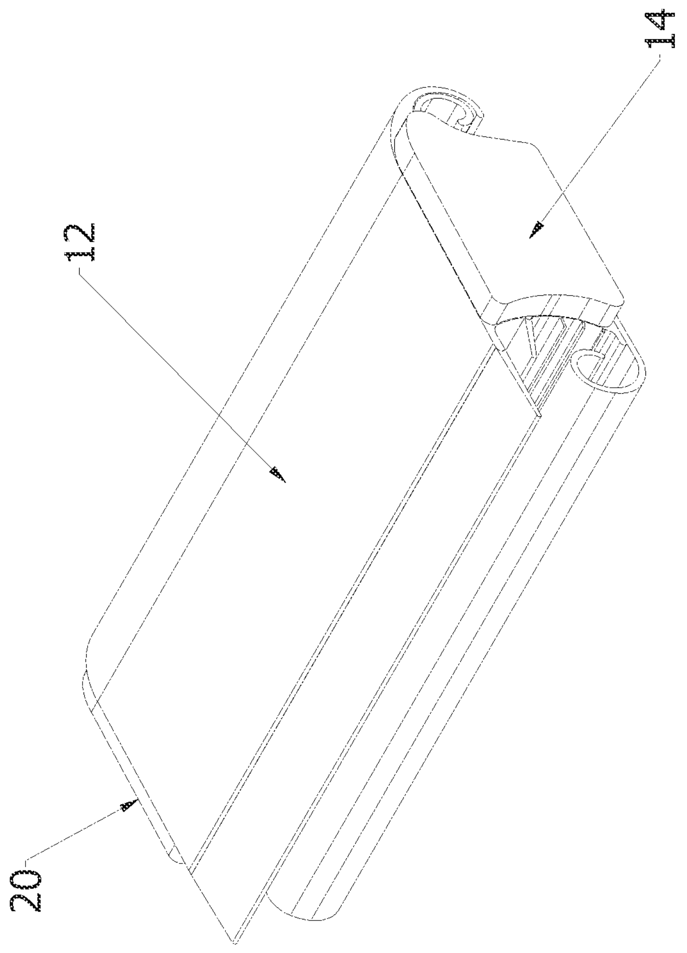
FIG. 4 is a perspective view of the slat shown in FIG. 3 after it has been fully assembled and closed at both ends of the slat after a vacuum has been created within the slat.
Figure 5:
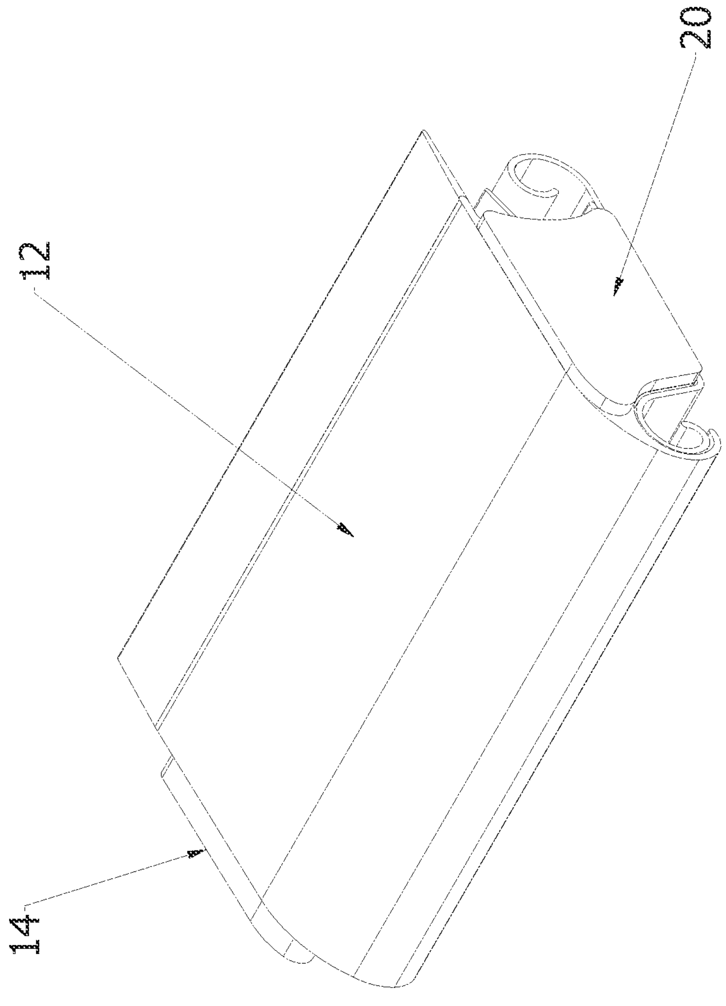
FIG. 5 is similar to FIG. 4 with both end caps installed.

A second end cover 16 has a thickness t4 and is sized and shaped to be received within the cavity 12*c* through the opening 12*d* at the second end 12*b* and has an external surface 16*a* that conforms to the internal surface 12*e* with little or no clearance. In the embodiment shown in FIGS. 1 and 2 the second end cover 16 includes at least one hole or aperture 16*b* that extends through the thickness t4 and a rubber valve 18, such as a sports ball valve disclosed in U.S. Published Patent Application No. 2006/0264278 A1. Two rubber vales 18 are shown in FIGS. 1-3 although the number of valves is not critical and the number of valves that could or should advantageously be used can be a function of the configuration of the extrusion and/or the configurations of any internal ribs or walls therein, as will be further discussed below. Once both end covers 14, 16 are fully inserted at the opposing ends of the extruded profile 12, as shown in FIGS. 3-5, and secured to provide hermetic seals by any suitable or conventional means, the air within the cavity 12*c* is purged by inserting an air needle (not shown) into the rubber valve(s) and the air removed by any suitable vacuum pump. Once the air has been purged or removed the air needle is removed from the valve(s). Depending on the efficiency or effectiveness of the rubber valves 18 to maintain a vacuum within the slat a solid plate 20 can be used to ensure the inability of air to flow back into the slat and ultimately compromise the vacuum and the R-value of the slat. If used, a solid cover plate 20 is dimensioned and configured to conform to the lateral edge surface 12*f* is secured along the lateral edge surface 12*f* to provide a hermetic seal to prevent air from re-entering the extruded profile 12 through the rubber valve(s) 18 that may be less than 100% efficient in blocking air flow therethrough. Even minute leakages through the valves could, in time, compromise the level of vacuum within the slat and, therefore, the level of thermal insulation. By providing permanent hermetic seals at both ends of the extruded profile 12 after air has been evacuated from the slat the desired level of vacuum and insulation of the slat is ensured to continue indefinitely. Using the invention has increased the R-value of the slats to the range of 30-40 without the need to maintain the desired levels of vacuum by periodically purging air from the slats that may seep in over time.

Figure 6:
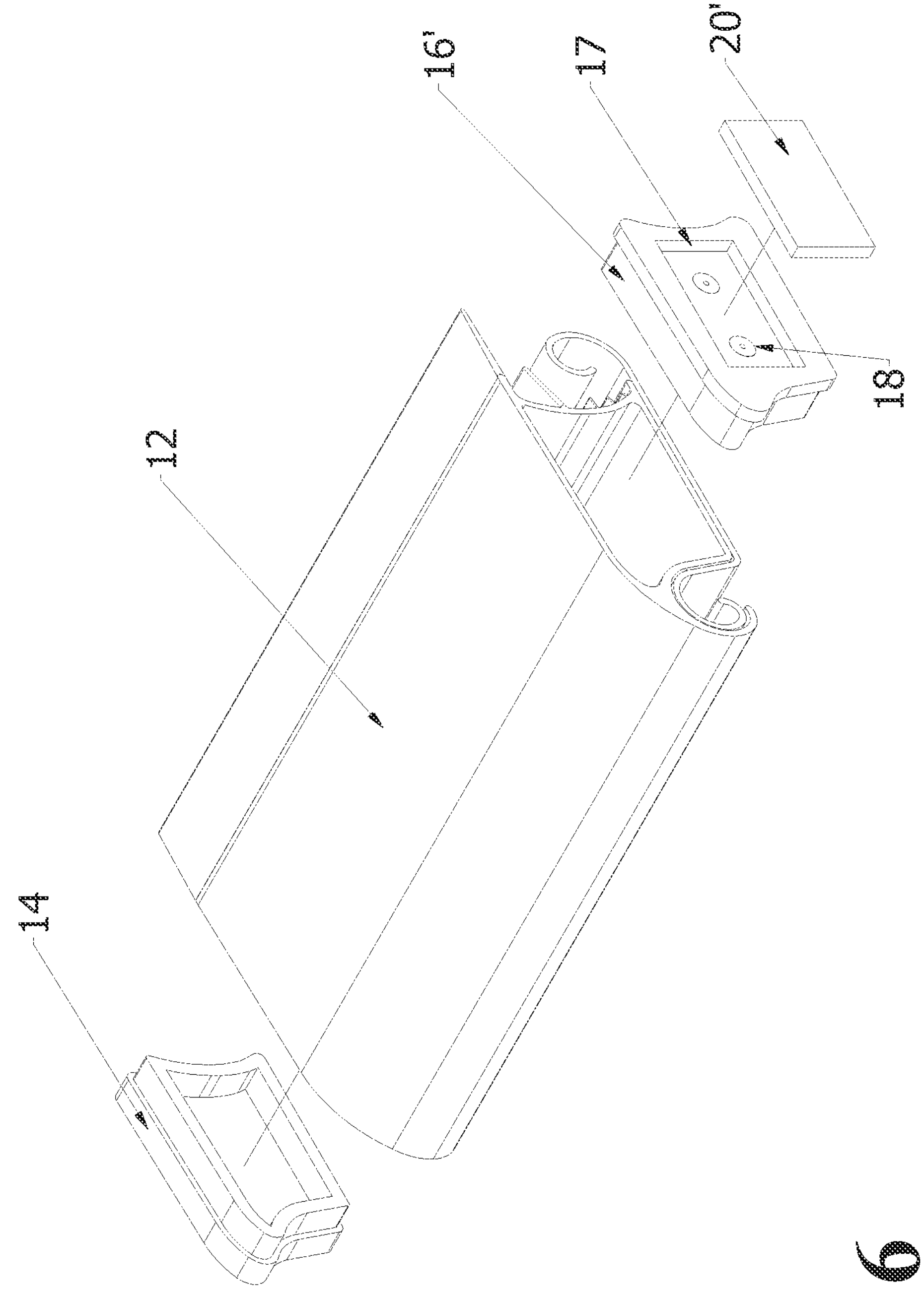
FIG. 6 is similar to FIG. 1 with a modified second end cover up or cap.
Figure 7:
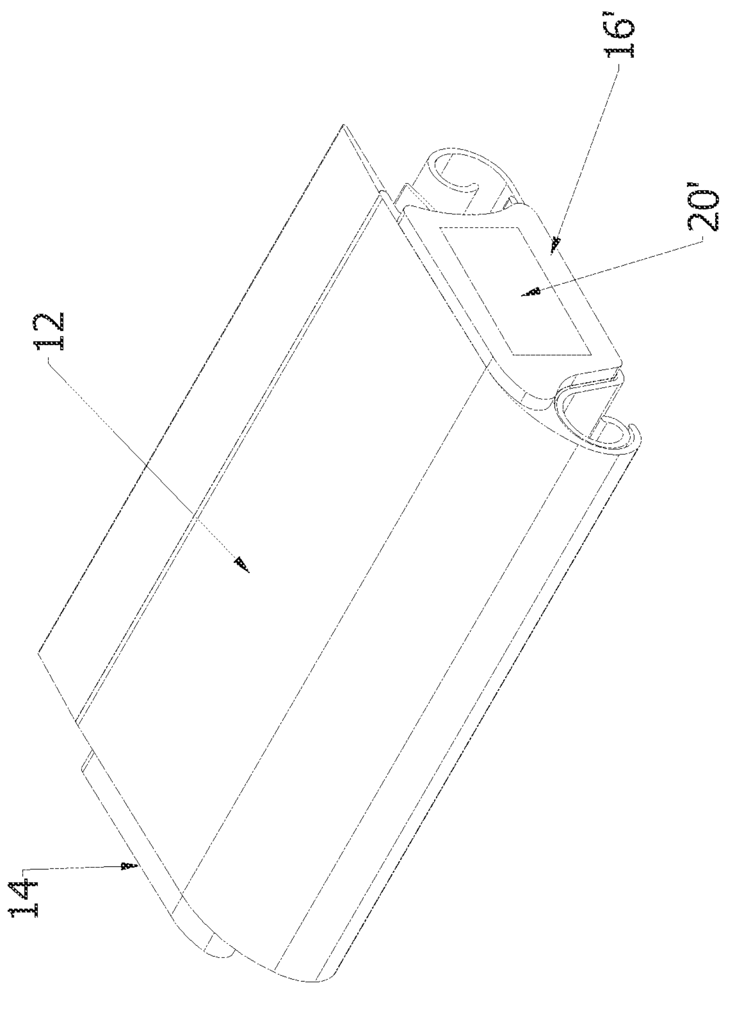
FIG. 7 is similar to FIG. 6 with the solid cover plate assembled to the modified end cap.

FIGS. 6 and 7 illustrate another embodiment with a modified second end cover 16' that includes a recessed window 17 in which the rubber valves 18 are mounted. A modified solid cover plate 20' is dimensioned to be received within the window 17 to hermitically seal the slat 10. However, as noted, if the valves provide hermetic seals and are 100% effective at preventing air leakage into the slat the cover plate 20' may not be necessary and may be omitted.

Figure 8:
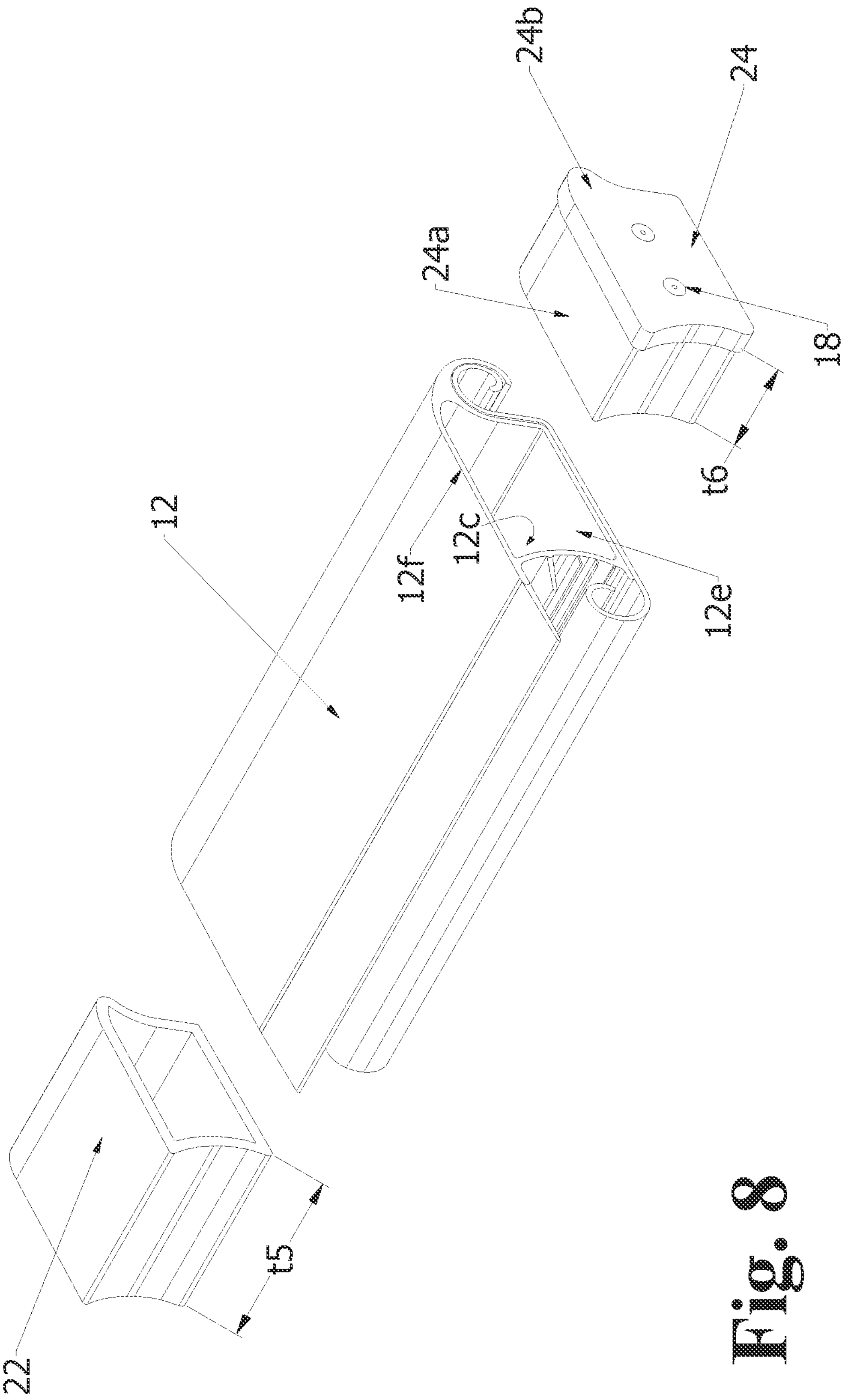
FIG. 8 is similar to FIG. 1 but show another embodiment of the slat with modified end caps or covers.

FIG. 8 illustrates a further embodiment of the invention in which the first end cover 22 has an axial length t5 greater than t2 and, like the end cover 14, is hermetically sealed at the first end 12*a*. The second end cover 24 includes an integrally formed first portion 24*a* that has an axial length t6 that is receivable within the cavity 12*c* and a second portion 24*b* that includes the rubber valve(s)

Figure 9:
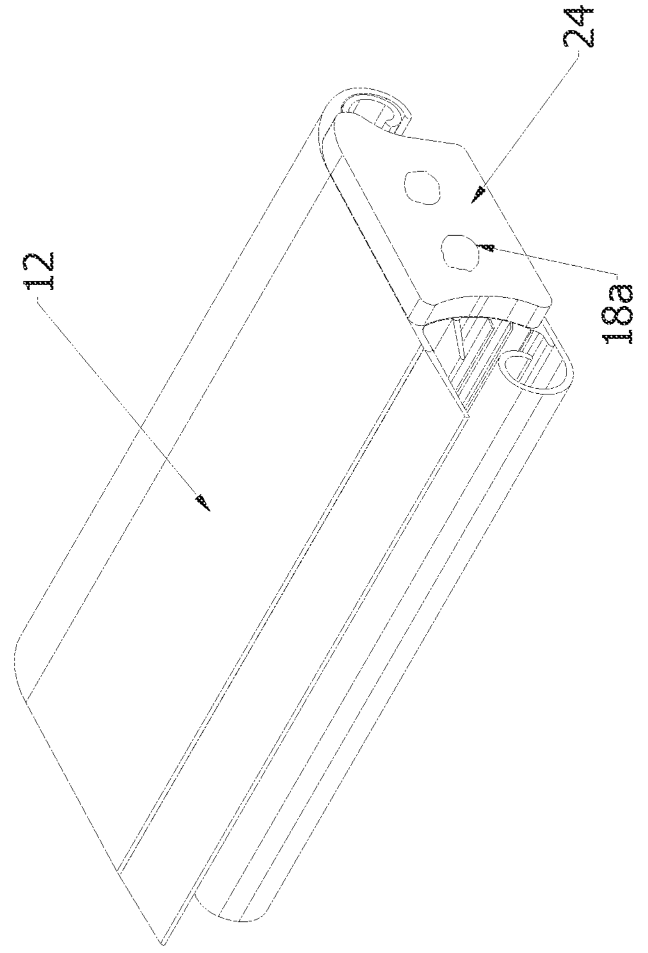
FIG. 9 is similar to FIG. 8 with epoxy applied to cover and seal the rubber valves after vacuum has been established within the slat.

It will be clear that the axial lengths of the covers at both ends is not critical as long as the covers have surfaces that abut or mate with the internal surface 12*e* with little or no clearance, or even interference fits between the surfaces, and are permanently hermetically sealed to ensure that there is no possibility of air leakage into the slat through the mating surfaces once a desired level of vacuum is formed within the slat. With the embodiment of FIG. 8 a solid cover plate, such as the plate 20 in FIG. 1, may not be needed to seal the rubber valves 18 once desired levels of vacuum have been formed within the slat if the valves are 100% effective to prevent air leakage. While solid cover plates have been used to create the hermetic seals it should be clear that any other known or conventional means may be used to achieve permanent hermetic seals at both ends of the slat. Thus, by way of example, the valves 18 can be hermetically sealed by covering them with epoxy 18*a* as shown in FIG. 9.

Figure 10:
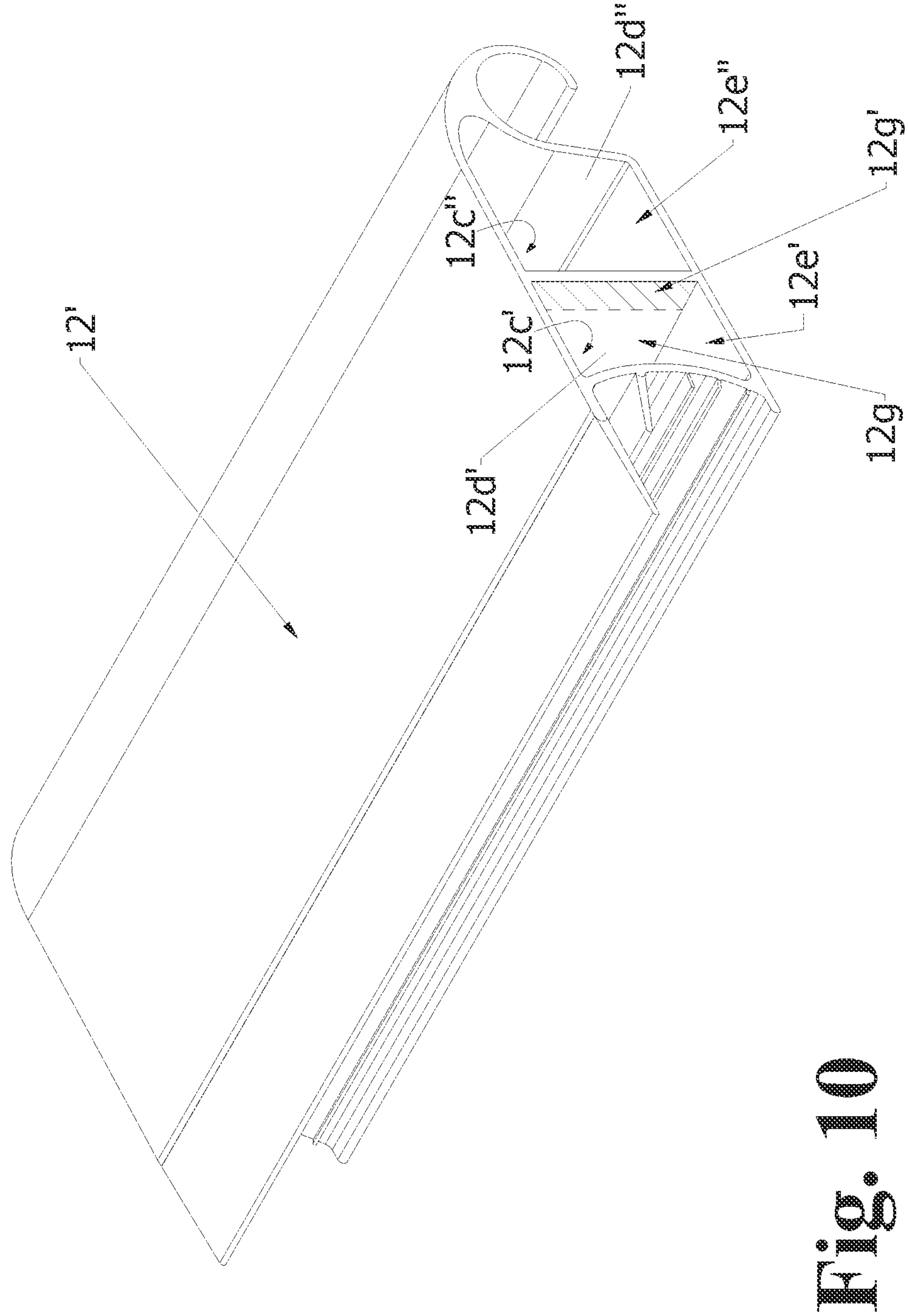
FIG. 10 is a perspective view of an extrusion of a slat that includes a reinforcing rib or wall.
Figure 11:
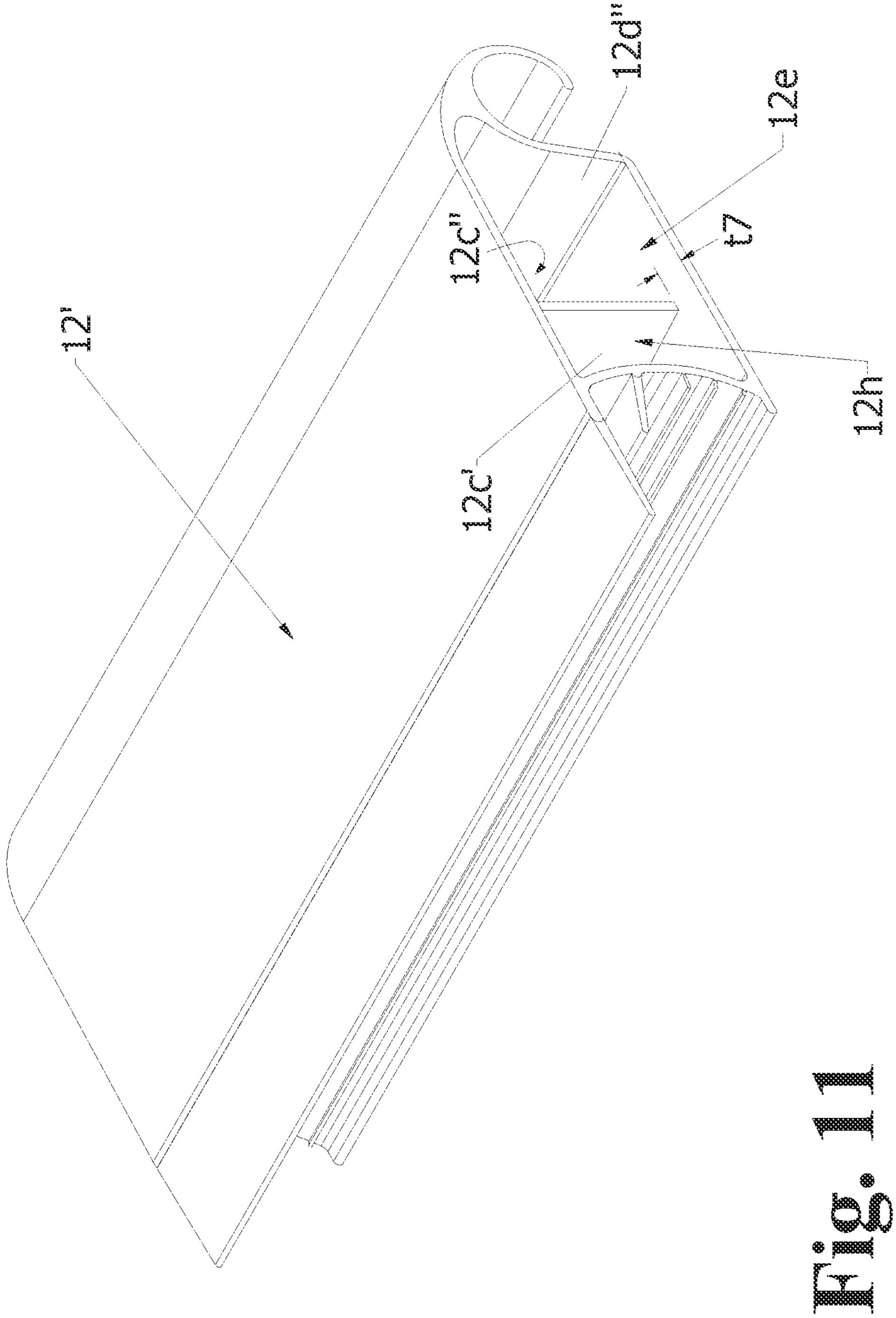
FIG. 11 is similar to FIG. 10 with a modified rib construction.
Figure 12:
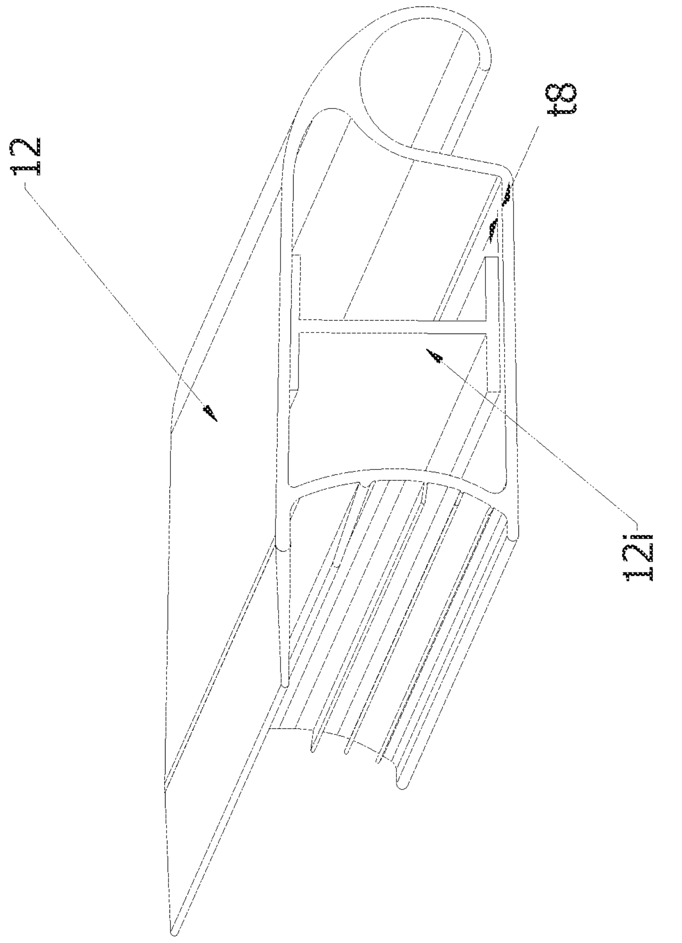
FIG. 12 is similar to FIG. 11 with further modified rib.
Figure 13:
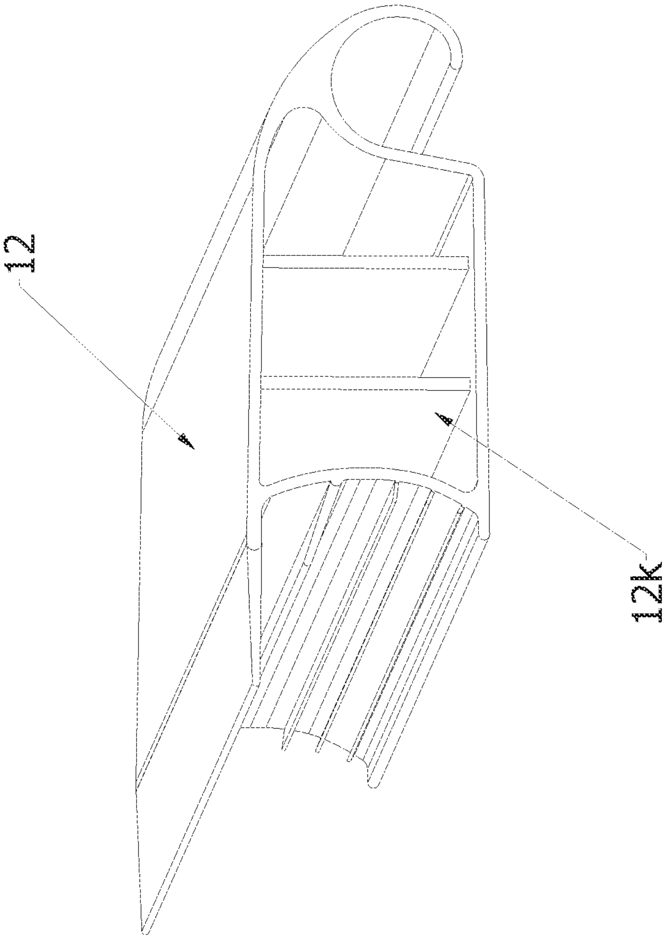
FIG. 13 is similar to FIG. 11 with multiple ribs.
Figure 14:
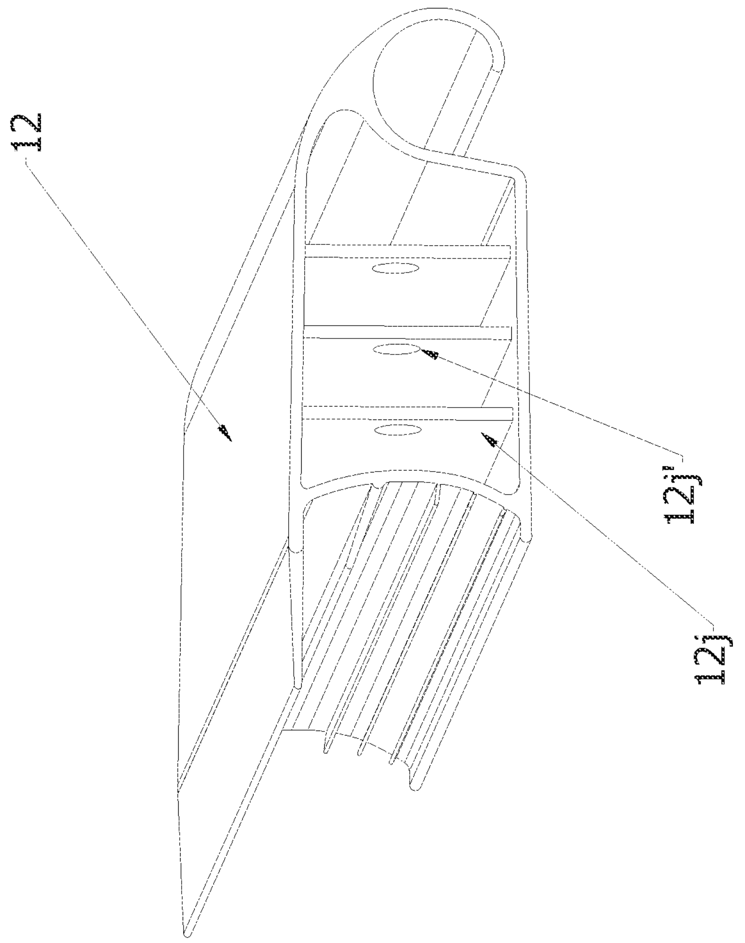
FIG. 14 is similar to FIG. 13 with openings within the ribs to equalize the pressure within the cavities formed by the multiple ribs.

FIG. 10 illustrates a modified extrusion profile 12' that includes a reinforcing wall or rib 12*g* to prevent collapse or deformation of the extrusion due to external pressure acting on the relatively thin walls after a vacuum is formed within the slat. The rib or wall 12*g* forms two parallel cavities 12*c*' and 12*c*" each defined by internal surfaces 12*e*', 12*e*". Since the rib or wall 12*g* is formed during extrusion of the profile it also extends into the planes of the openings 12*d*', 12*d*" preventing insertion of the end caps or covers into the cavities 12*c*', 12*c*" as aforementioned. Thus, either the end cap or cover portions 14*a*, 22 and 24*a* need to be slotted to receive the rib or wall 12*g* to allow insertion of the end covers or a portion 12*g*' of the rib or wall 12*g* needs to be removed to form a shortened rib 12*h* (FIG. 11) to allow receipt of the end caps or covers. It will be clear that when the wall or rib 12*g* is provided it creates two separate and distinct cavities 12*c*' and 12*c*". Once the end caps 16, 24 are hermetically attached to the extruded profile the number of rubber valves 18 will be equal to the number of cavities created by the reinforcing ribs or walls so that air can be evacuated from each of the cavities. Any rib or wall configurations that will resist deformation of the slats can be used. The ribs can be integrally formed with the extruded profiles as shown in FIG. 10 or can be separately formed and inserted into the cavity 12*c* shown in FIG. 1. By way of example, referring to FIG. 12, a reinforcing wall or rib 12*i*, shown as an I-beam cross-section, inserted into the cavity to form two adjoining elongate cavities and internal support. By selecting the ribs to be somewhat shorter than the extruded profiles gaps with dimension t7 (FIG. 11) and t8 (FIG. 12) fluid flow interior channels are formed to accommodate the end caps, such as end cap 16 in FIG. 1 having a thickness t4, and/or to allow pressures to equalize in adjacent cavities so that a single valve 18 can be used to purge air from both cavities. Similarly, two or more ribs 12*k* can be used, as shown in FIG. 13. When separately extruded the ribs 12*i*, 12*k* can be fixed in place after being inserted into the slat extrusions by any conventional means such as adhesive, epoxy or the like. In FIG. 14 openings or apertures 12*j*' are formed in ribs 12*j* to equalize pressures in the resulting cavities so that a single rubber valve 18 can be used instead of using a separate valve for each cavity.

Figure 15:
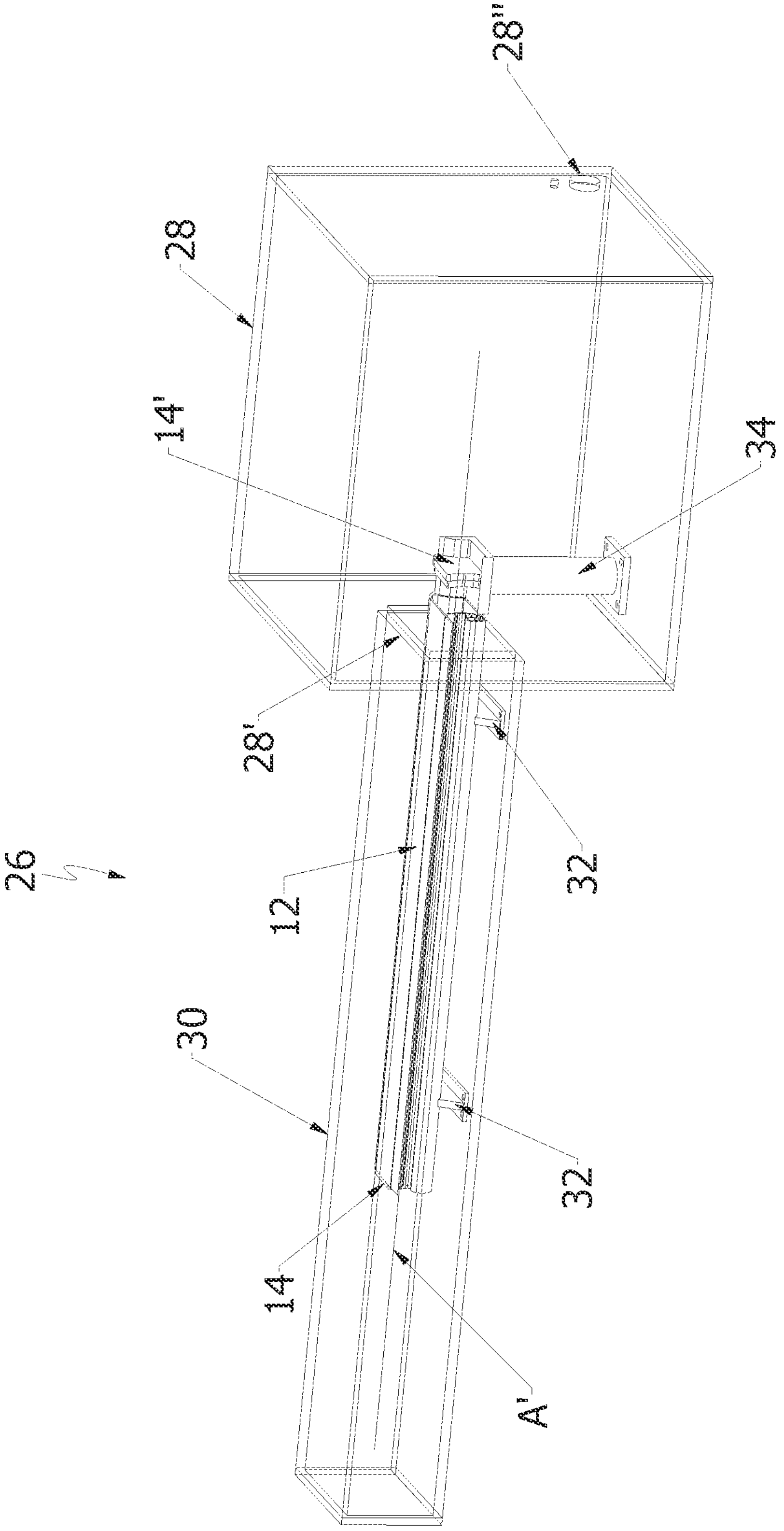
FIG. 15 is a perspective view of an apparatus for creating vacuum slates in accordance with the invention.
Figure 16:
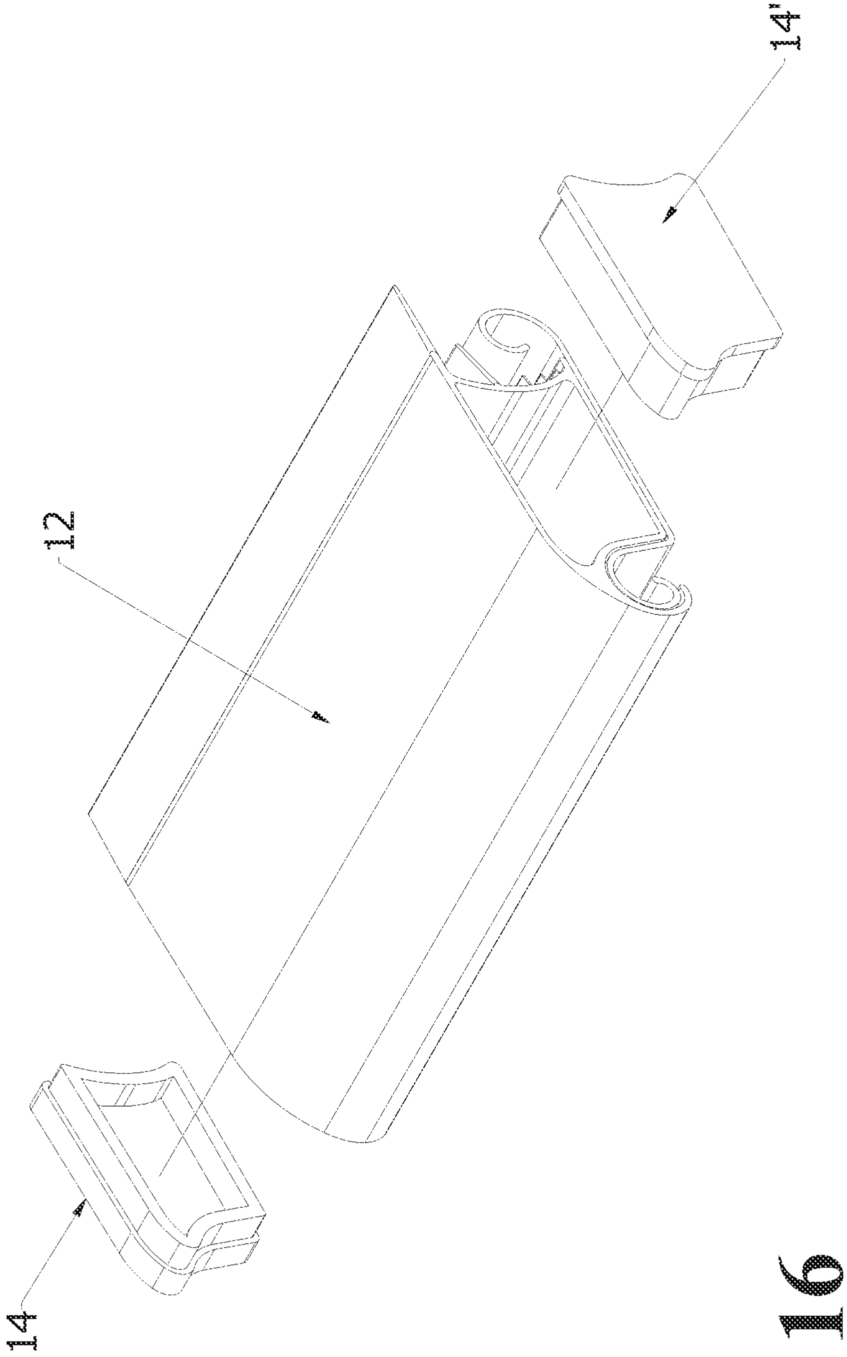
FIG. 16 is an enlarged view of the end covers shown in FIG. 15.
Figure 17:
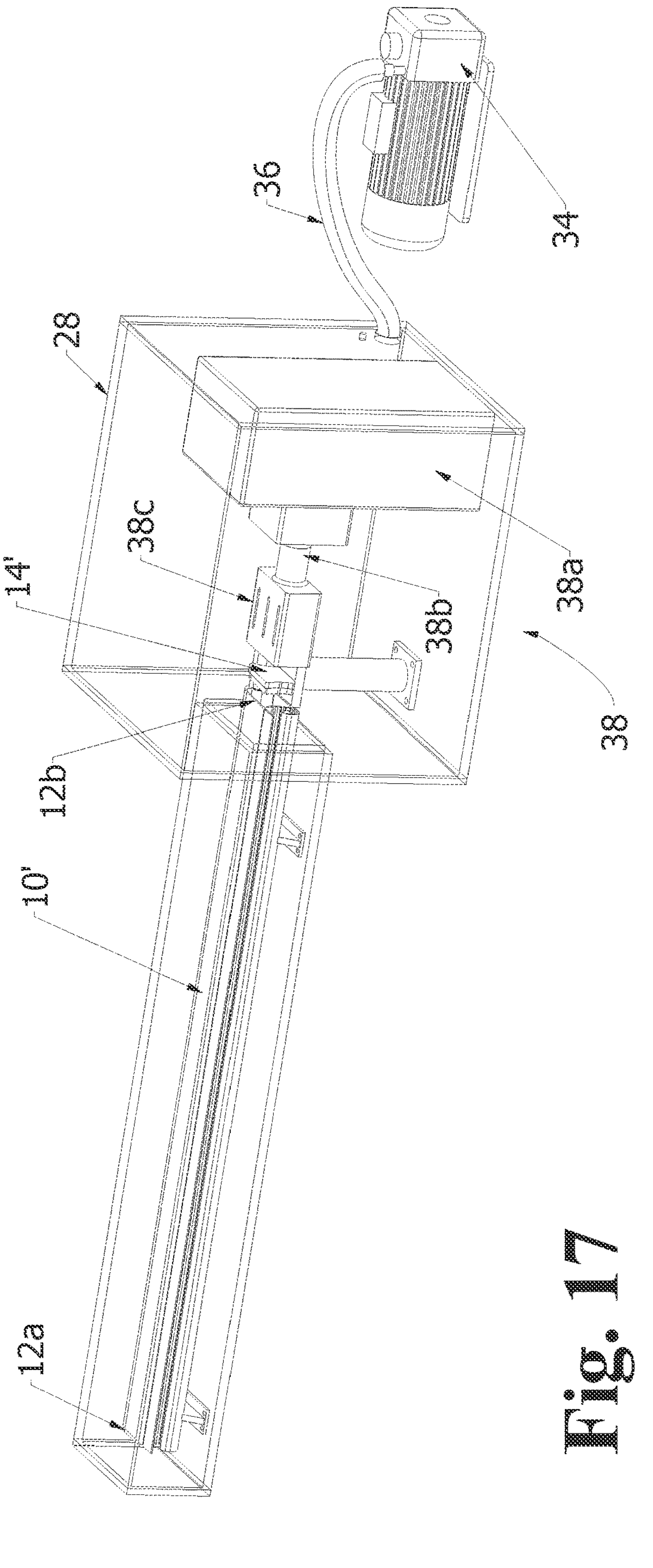
FIG. 17 is similar to FIG. 15 but also shows a vacuum pump and welding device for purging air from the chambers and welding end caps to seal a stationary slat.

The embodiments shown in FIGS. 1-14 allow the slats to be evacuated in ambient atmosphere where the slats can be assembled outside of an airtight container since the chambers or cavities are purged of air and vacuum is formed after the slats are hermetically sealed. It is also possible to create a vacuum within the slats before they are fully assembled. Referring to FIGS. 15-18, a system or apparatus is shown that allows a vacuum to be formed within the slat 10 without the use of rubber valves mounted on the slat itself. This can be achieved by a slat assembly apparatus 26 that includes a closing or sealing station 28 and a slat receiving enclosure 30. The slat receiving enclosure 30 is an elongated chamber having a length to accommodate a slat of a predetermined length or long enough to accommodate a range of slat lengths. Slat supporting members 32 support and center or align the extruded profile 12 along an assembly axis A'. The closing or sealing station 28 has a window or opening 28' dimensioned to correspond to the cross-sectional area of the slat-receiving enclosure 30 and these are hermetically joined at the interface where the closing or sealing station is joined to the slat-receiving enclosure. A support member 34 is provided to support an end cover corresponding to any of the aforementioned end covers and to position such end cover in alignment along the axis A'. Referring to FIGS. 15-17 the closing or sealing station 28 *s* provided with an opening 28" for evacuating air from both the chamber 28 and the slat-receiving enclosure 30. To purge air from the slat assembly apparatus a vacuum pump 34 is connected to the slat assembly apparatus by means of a hose or tube 36. Evacuation of air from the closing or sealing station 28 also evacuates air from the slat receiving enclosure 30 since these are in fluid-flow communication and a vacuum is formed throughout the apparatus 26.

In use, one end, the remote end 12*a* of the extrusion, is closed and sealed as aforementioned before being placed within the enclosure 30. When air is evacuated by the pump 34 air is also purged from the interior cavity 12*c* of the extrusion. Once the desired vacuum has been achieved within the apparatus and, therefore, within the cavity 12*c* of the extrusion, a power supply and control circuitry 38*a* includes a plunger 38*b* that supports an ultrasonic tool 38*c*. When the air has been evacuated from the extrusion the power supply and control circuitry 38*a* causes the plunger 38*b* to advance towards the extrusion and forces the end cover 14' to be inserted into the end 12*b*. After insertion, and once the end cover 14' is fully seated within the end 12*b*, the welding unit welds the end cover 14' to the end 12*b* of the extrusion. After the vacuum has been hermetically sealed it can be removed from the apparatus. The specific welding unit 38 is not critical as long as the end cap 14' can be inserted into and welded to the end 12*b*. One example of a suitable welding unit that can be used is an ultrasonic metal welder marketed by Sonics & Materials, Inc. of Newtown, CT 06470. FIG. 16 illustrates the end cap 14' shown in FIG. 15. The end cap 14' does not have nor does it require rubber valves to evacuate the air from the extruded profile 12, the air being purged from the entire sealing chamber 28 thereby also creating a vacuum within the profile. Once a desired vacuum is created within the extruded profile the end cap 14' can be mated with and hermetically seal the profile to ensure that the vacuum is maintained within the profile indefinitely.

In FIG. 17 the extruded profile is maintained stationary and serves as an anvil and it is the welding unit 38 that moves relative to the stationary extrusion. Once the cap has been inserted into the extrusion end 12*b* the welding unit 38 applies pressure between the extrusion end 12*b* and the cap 14' and vibrates to rub the two abutting surfaces one against the other under pressure causing a bond to be formed by ultrasonic welding. The specific method of hermetically sealing the slat is not critical and any other known or conventional sealing method can be used.

Figure 18:
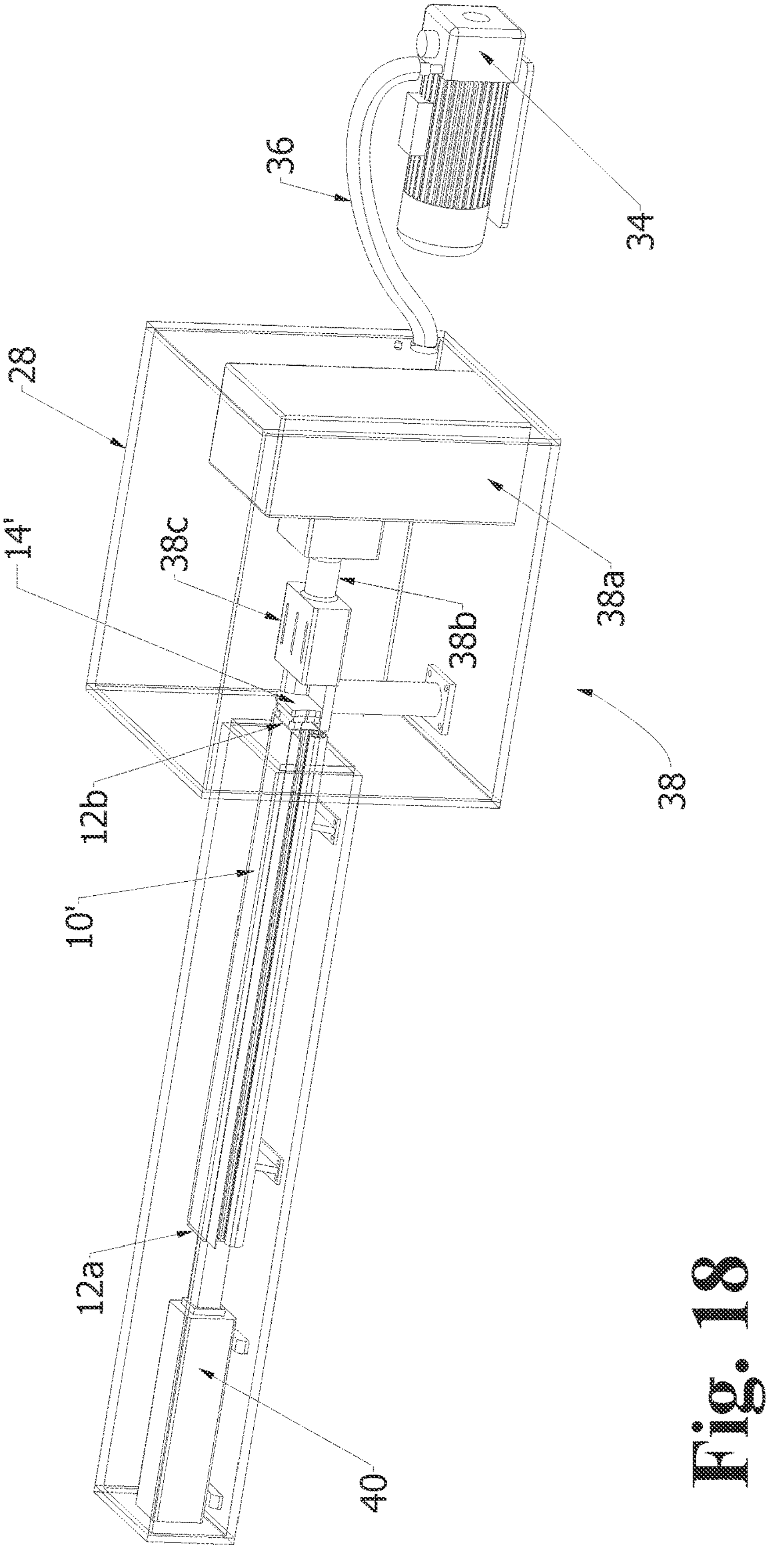
FIG. 18 is similar to FIG. 17 but shows a plunger to advance the slat towards the welding unit.

FIG. 18 illustrates a further embodiment of the invention, a variation of the embodiment shown in FIG. 17, in which the welding unit 38 is stationary and it is the extruded profile that moves. This is achieved by providing a plunger 40 that causes the extruded profile to move towards the right, as viewed in FIG. 9. The extrusion moves in alignment with the position of the end cover 14' and the ultrasonic tool 38*c* can also advance to cause insertion of the end cover into the end 12*b*. Once insertion has been completed the welding unit can be activated as aforementioned.

For purposes of the invention the term "maintenance free" is defined as a slat that retains its level of vacuum and R-value indefinitely. However, this term is also intended to cover slats that may require some periodic maintenance to restore the desired levels of vacuum and R-values, such as annually, semi-annually or even quarterly for less costly slats that use, for example, less expensive or effective components, such as valves that may exhibit very low levels of air leakage over time. However, in all cases the vacuum slats provide improved insulative properties and increased R-values over conventional slats that typically have R-values that do not exceed 11.

While the invention has been shown and described with reference to certain embodiments thereof, it will be understood by those skilled in the art that various changes in form and detail may be made therein without departing from the spirit and scope of the invention as defined by the appended claims and their equivalents.

The invention claimed is:

1. A rolling door vacuum slat comprising a hollow elongate tubular member having first and second opposing ends and having an airtight cavity with a substantially uniform cross-sectional configuration along its length; means for evacuating air from said airtight cavity and for creating a vacuum within said cavity, and means for hermetically sealing said cavity after a predetermined level of vacuum has been created within said cavity to provide said slat with an R-value greater than 11 that does not require air evacuation maintenance more frequently than quarterly maintenance to maintain said R-value, said means for hermetically sealing said cavity comprising at least one cap for sealing at least one of said opposing ends, said at least one cap being joined to one of said first and second opposing ends of said elongate tubular member to form hermetic seals to maintain the slat airtight after a vacuum has been created within the slat.

2. The vacuum slat as defined in claim 1, wherein said first and second opposing ends have cross-sections that conform to said cross-sectional configuration.

3. The vacuum slat as defined in claim 1, further comprising reinforcement means within said cavity to prevent said tubular member from deforming due to the vacuum within said cavity.

4. The vacuum slat as defined in claim 2, wherein said means for evacuating air from said airtight cavity comprises a valve provided on said at least one cap.

5. The vacuum slat as defined in claim 1, wherein said elongate tubular member is formed of a rigid material that resists deformation when a vacuum exists within said cavity.

6. The vacuum slat as defined in claim 2, wherein said means for evacuating air from said airtight cavity comprises a rubber valve provided on said at least one cap through which air can be evacuated by means of a hollow air needle inserted into the valve to purge air within said cavity with a vacuum pump; and sealing means to permanently seal said rubber valve after a desired level of vacuum is formed within said cavity.

7. The vacuum slat as defined in claim 6, wherein said sealing means comprises a plate generally conforming to the shape of said at least one cap; and means for permanently securing said plate to said at least one cap to permanently cover said at least one cap and said rubber valve.

* * * * *